United States Patent
Ni

(10) Patent No.: US 9,075,639 B1
(45) Date of Patent: Jul. 7, 2015

(54) SYSTEMS AND METHODS FOR HANDLING INTERRUPTS DURING SOFTWARE DESIGN SIMULATION

(71) Applicant: Altera Corporation, San Jose, CA (US)

(72) Inventor: Yi Ni, San Jose, CA (US)

(73) Assignee: Altera Corporation, San Jose, CA (US)

( * ) Notice: Subject to any disclaimer, the term of this patent is extended or adjusted under 35 U.S.C. 154(b) by 462 days.

(21) Appl. No.: 13/658,057

(22) Filed: Oct. 23, 2012

(51) Int. Cl.
  *G06F 13/24* (2006.01)
  *G06F 9/44* (2006.01)
  *G06F 9/455* (2006.01)
  *G06F 9/48* (2006.01)

(52) U.S. Cl.
  CPC .............. *G06F 9/455* (2013.01); *G06F 9/4812* (2013.01); *G06F 2217/86* (2013.01); *G06F 9/4825* (2013.01); *G06F 13/24* (2013.01)

(58) Field of Classification Search
  CPC ..... G06F 9/4825; G06F 13/24; G06F 9/4812; G06F 9/455; G06F 2217/86
  USPC ............................................. 703/21; 710/260
  See application file for complete search history.

(56) References Cited

U.S. PATENT DOCUMENTS

| | | | | |
|---|---|---|---|---|
| 4,409,653 | A * | 10/1983 | Bruce, Jr. ...................... | 710/262 |
| 5,663,900 | A * | 9/1997 | Bhandari et al. .............. | 716/106 |
| 5,768,567 | A * | 6/1998 | Klein et al. ..................... | 703/13 |
| 5,862,366 | A * | 1/1999 | Schmidt et al. ................ | 703/21 |
| 5,941,976 | A * | 8/1999 | Gulick .......................... | 710/260 |
| 6,128,672 | A * | 10/2000 | Lindsley ......................... | 710/19 |
| 6,145,047 | A * | 11/2000 | Garinger et al. .............. | 710/261 |
| 6,263,395 | B1 * | 7/2001 | Ferguson et al. ............. | 710/262 |
| 6,681,384 | B1 * | 1/2004 | Bates et al. ................... | 717/129 |
| 8,135,894 | B1 * | 3/2012 | Ball .............................. | 710/264 |
| 8,170,859 | B1 * | 5/2012 | Christensson et al. .......... | 703/22 |
| 2002/0053927 | A1 * | 5/2002 | Stevens .......................... | 326/93 |
| 2004/0236875 | A1 * | 11/2004 | Jinzaki ............................ | 710/15 |
| 2005/0144346 | A1 * | 6/2005 | Barth et al. ................... | 710/260 |

(Continued)

OTHER PUBLICATIONS

Jigang, Wu et al., "A Branch-and-Bound Algorithm for Hardware/Software Partitioning", IEEE, Centre for High Performance Embedded Systems, Nanyan Technological University, 2004, pp. 526-529.

(Continued)

*Primary Examiner* — Akash Saxena
(74) *Attorney, Agent, or Firm* — Kwan & Olynick LLP

(57) ABSTRACT

Disclosed are apparatus and methods for simulating a software design that is to be implemented in a system. A co-simulation platform comprising a physical link coupling a first physical component with a models module is provided. The models module emulates one or more other physical components of the system, and such models module includes a processor model associated with an interrupt service routine (ISR) for handling an interrupt on an interrupt line of the first physical component. Via a physical link, an interrupt request from the interrupt line of the first physical component is received into the models module. In response to the received interrupt request, the ISR associated with the processor model is initiated. Prior to exiting the ISR, an interrupt line de-assert request is sent from the models module to the first physical component via the physical link. Prior to exiting the ISR and prior to receiving a physical de-assertion of the interrupt line from the first physical component via the physical link, the models module generates a premature de-assertion of the interrupt line and causes such premature de-assertion to be received by the processor model.

20 Claims, 7 Drawing Sheets

(56) References Cited

U.S. PATENT DOCUMENTS

| | | |
|---|---|---|
| 2005/0154811 A1* | 7/2005 | DeWitt et al. ............... 710/260 |
| 2005/0228921 A1* | 10/2005 | Sethi et al. ................... 710/268 |
| 2005/0246466 A1* | 11/2005 | Wright et al. ................ 710/260 |
| 2005/0268016 A1* | 12/2005 | Mowry et al. ................ 710/260 |
| 2007/0016710 A1* | 1/2007 | Kimelman et al. ........... 710/264 |
| 2007/0101034 A1* | 5/2007 | Ta et al. ....................... 710/260 |
| 2008/0091867 A1* | 4/2008 | Plondke et al. ............... 710/261 |
| 2008/0294825 A1* | 11/2008 | Mahalingam et al. ........ 710/262 |
| 2011/0289242 A1* | 11/2011 | Srinivasan et al. ............ 710/22 |
| 2011/0307233 A1* | 12/2011 | Tseng et al. ................... 703/14 |
| 2014/0101352 A1* | 4/2014 | Chen et al. .................... 710/260 |
| 2014/0108688 A1* | 4/2014 | Gulati et al. .................. 710/260 |

OTHER PUBLICATIONS

Jigang, Wu et al., "A Hybrid Branch-and-Bound Strategy for Hardware/Software Partitioning", Eight IEEE/ACIS International Conference on Computer and Information Science, 2009, pp. 641-644.

Strachacki, Marek , "Speedup of Branch and Bound Method for Hardware/Software Partitioning", IEEE Proceedings of the 2008 1st International Conference on Information Technology, IT 2008, May 2008, 4 pgs.

Sudarsanam, Arvind et al., "A Fast and Efficient FPGA-based Implementation for Solving a System of Linear Interval Equations", IEEE, Reconfigurable Computing Group, Utah State University, 2005, 2 pgs.

* cited by examiner

SYSTEMS AND METHODS FOR HANDLING INTERRUPTS DURING SOFTWARE DESIGN SIMULATION

TECHNICAL FIELD OF THE INVENTION

This invention relates generally to mechanisms for simulation of software for hardware systems. More specifically, this invention relates to a simulation system that includes multiple simulation domains with different speeds.

BACKGROUND

An electronic system design may incorporate any number of configurable or programmable logic devices, such as programmable logic devices (PLDs) or field programmable gate arrays (FPGAs). PLDs and FPGAs can be used to implement any logical function, for example, that an ASIC could perform. Additionally, PLDs and FPGAs are reconfigurable so as to allow updating of various programmable functions as needed. For example, FPGA's contain programmable logic elements and configurable and reconfigurable interconnects that allow the logic elements to be arranged together into different configurations to perform various functions. The logic elements generally also include memory elements, which may be simple flip-flops or more complete blocks of memory.

An electronic system design may also incorporate software. As these systems grow in complexity and size, one bottleneck in the design process may be debugging of the system software. Accordingly, it would be beneficial to provide improved methods and apparatus for debugging software for implementation in hardware systems.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, apparatus and devices for method of simulating a software design that is to be implemented in a system are disclosed. A method embodiment may includes (a) providing a co-simulation platform comprising a physical link coupling a first physical component with a models module, which emulates one or more other physical components of the system, wherein such models module includes a processor model associated with an interrupt service routine (ISR) for handling an interrupt on an interrupt line of the first physical component; (b) via a physical link, receiving into the models module an interrupt request from the interrupt line of the first physical component; (c) in response to the received interrupt request, initiating the ISR associated with the processor model; (d) prior to exiting the ISR, sending a interrupt line de-assert request from the models module to the first physical component via the physical link; and (e) prior to exiting the ISR and prior to receiving a physical de-assertion of the interrupt line from the first physical component via the physical link, generating by the models module a premature de-assertion of the interrupt line and causing such premature de-assertion to be received by the processor model.

In one aspect, receipt of the interrupt request and initiation of the ISR form part of a simulation for debugging the software design that is to be implemented in the system. In another aspect, a method may also include preventing the interrupt request from being received by the processor model after causing the premature de-assertion to be received by the processor model so that the associated ISR is not retriggered after the ISR exits and prior to de-assertion of the interrupt line by the first physical component. In one example, the first physical component is a custom IP device of a programmable logic device.

In a specific implementation, generating by the models module a premature de-assertion of the interrupt line and causing such premature de-assertion to be received by the processor model is accomplished by (i) after the ISR is initiated, sending by the ISR a request for the premature de-assertion of the interrupt line to an interrupt controller module in the models module and (ii) upon receipt of the request for the premature de-assertion by the interrupt controller, the interrupt controller generating a premature de-assertion of the interrupt line that is sent to the processor model and preventing the interrupt request from reaching the processor. In a further aspect, a plurality of states for de-assertion and assertion by the models module and by the first physical device are tracked. In another embodiment operations (a)-(e) are performed after verifying functional operation of a hardware design of the system and prior to fabrication of the system based on such hardware design. In a further aspect, the software design is integrated into the fabricated system after the software design is debugged via the simulation of such software design on the co-simulation platform.

In an alternative embodiment, the invention pertains to a co-simulation platform for simulating a software design that is to be implemented in a system. The platform comprises a first physical component configured to represent a configurable component of the system and a models module configured to emulate one or more other physical components of the system. The models module includes a processor model associated with an interrupt service routine (ISR) for handling an interrupt on an interrupt line of the first physical component. The platform further comprises a physical link for coupling the first physical component with the models module. The models module is further configured to perform one or more of the above described methods. In another embodiment, the invention pertains to at least one computer readable storage medium having computer program instructions stored thereon that are arranged to perform one or more of the above described methods.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
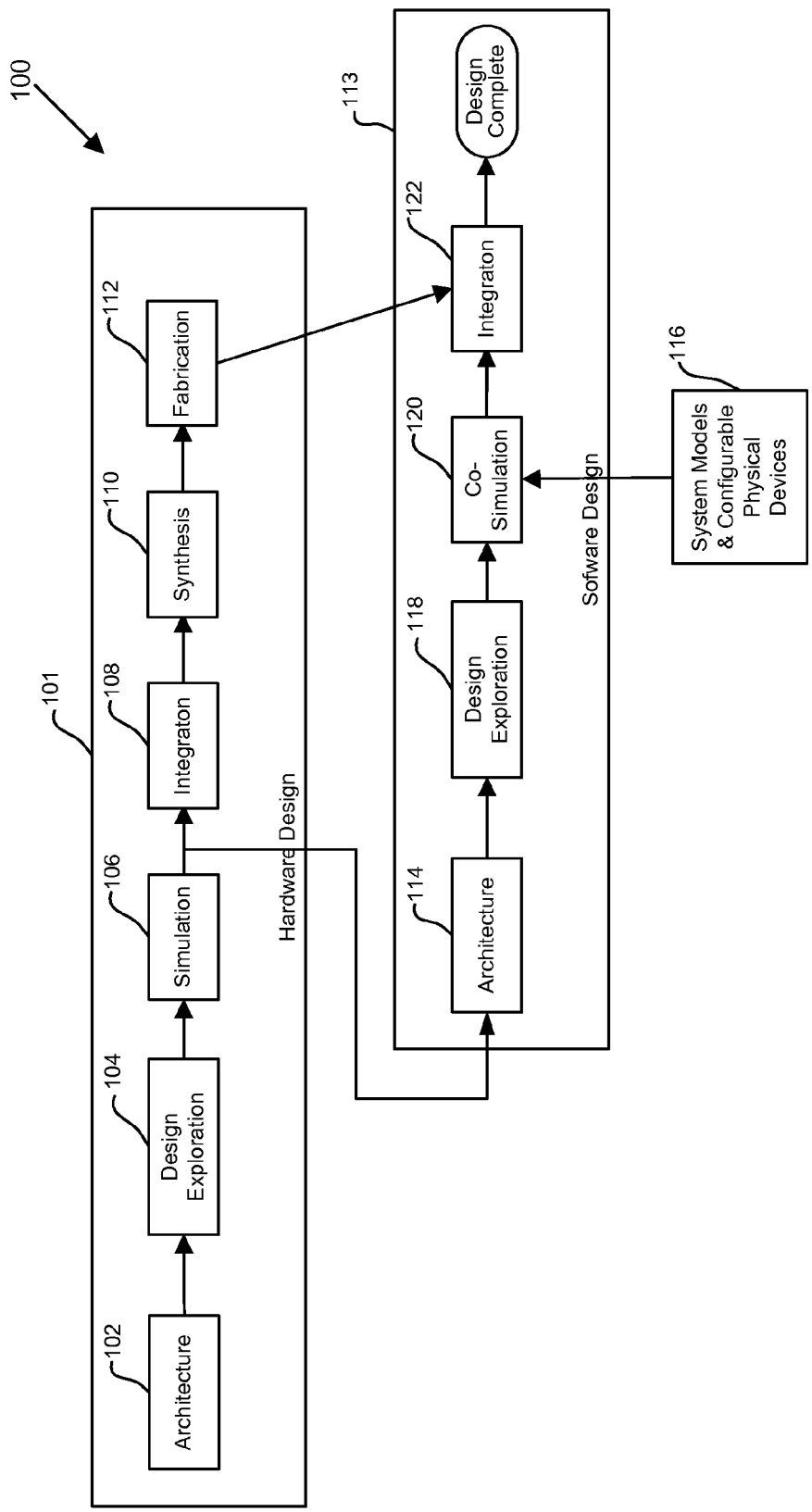
FIG. 1 is an example design flow in accordance with one embodiment of the present invention.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Embodiments of the present invention will be explained in connection with various specific devices, circuits, applications, etc. herein. However, these references are for purposes of illustration only and are not intended to limit the present invention in any way. For example, one or more embodiments of the present invention will be explained in the context of programmable logic devices (PLDs) or field programmable gate array (FPGA) devices and technologies related thereto to illustrate the present invention. However, the invention is widely applicable to other devices and in other environments. Moreover, embodiments of the present invention may be used in a wide variety of functions and/or applications.

In this disclosure, a "configurable device" is a programmable device that ultimately contains user logic (that is, the function(s) programmed and implemented in a programmable device by a user, for example an electronic design). Typically, such a device has a volatile memory and must be programmed upon each power-up, though not every configurable device must possess these characteristics. Examples of configurable devices include SRAM PLDs and RAM-based PLDs (for example, Altera FLEX and STRATIX devices).

When a system that utilizes programmable devices is being developed, this system may also use other components, such as a processor with embedded software. For example, a system-on-chip (SoC) design may include programmable logic devices, such as FPGA, as well as standard components. For example, a system may include one or more configurable devices, one or more embedded software configured components, such as a central processing unit, and one or more other standard components, such as Ethernet MAC, USB and UART. Additionally, these components may be implemented in any number and type of chips or devices.

A system design process may include both a hardware design process and a software design process. A typical hardware design process may include designing the hardware components, simulation and integration of the hardware components, synthesis of the hardware design, and fabrication of the hardware system. After the hardware system is fabricated, the system software for such hardware system may then be designed and developed. The software may then be debugged on the hardware system and then finally integrated into a final system.

As hardware systems and associated software become more complex (e.g., in the development of new smartphone and tablet devices), the timeframe for hardware development has significantly increased (e.g., 1.5 years for design and fabrication of the hardware system). The software design timeframe has also similarly increased and often takes longer than the hardware design timeframe, resulting in significant delays in getting a SoC design to market.

Instead of having software development depend on completion of the hardware system, certain embodiments of the present invention allow software development to begin upon completion of functional simulation of the hardware design. FIG. 1 is an example design flow 100 in accordance with one embodiment of the present invention. In a hardware design phase 101, an overall design architecture may be generated and reviewed in operation 102. For instance, design goals and specifications are formulated. In operation 104, various designs may be explored based on the architecture. For instance, different design components may be reviewed to determine which components to use for the design architecture. Additionally, different components may be instantiated using schematic and/or hardware description language (HDL) tools, such as Verilog. The hardware design may then be simulated in operation 106 and adjusted as needed. For example, the schematics and/or HDL designs are input to any suitable simulation program to verify the functional operation of the design.

After the function of the design is verified through simulation, the software design 113 may commence without waiting for the hardware to be fabricated. Similar to the hardware design flow, the design architecture may be specified and various design arrangements explored in operations 114 and 118, respectively. Software is designed to be implemented on a particular hardware configuration that includes both standard and configurable physical devices. Accordingly, a co-simulation platform that includes one or more configurable components 116, e.g., FPGA, and one or more system models for emulating one or more standard physical devices may then be used to debug the software design in operation 120.

System models (e.g., standard components that are modeled in a C language) can be developed to emulate various functions of standard physical components of the hardware design, while one or more physical configurable devices are configured to implement the configurable hardware portions of the hardware design. The system models may include previously generated models or one or more new models may be generated (e.g., for a new CPU architecture).

The system models may only emulate portions of the hardware that are needed for debugging the system software. For example, the models may emulate only hardware functions that are utilized by the software, such as register read and write, display, Ethernet MAC, UART, JTAG interfaces, etc. In contrast, the models do not need to emulate the hardware at a physical structure level, such as a gate level. When software is being developed to run on such system models, the software that is being developed may also include specific hardware software, such as software drivers Concurrently, the hardware design, which includes standard components and configurable components (e.g., in a system on chip), is synthesized in operation 110 and then fabricated in operation 112. After the software design is debugged, the software design can then be integrated into the fabricated hardware in operation 122 resulting in a finalized hardware and software system. Since the software design can commence prior to fabrication of the final hardware system, the entire hardware and software time can be shortened as compared to waiting to commence software design after fabrication of the hardware system. Specifically, the time for integrating the hardware components 108, hardware system synthesis 110, and fabrication 112 may be saved.

Figure 2:
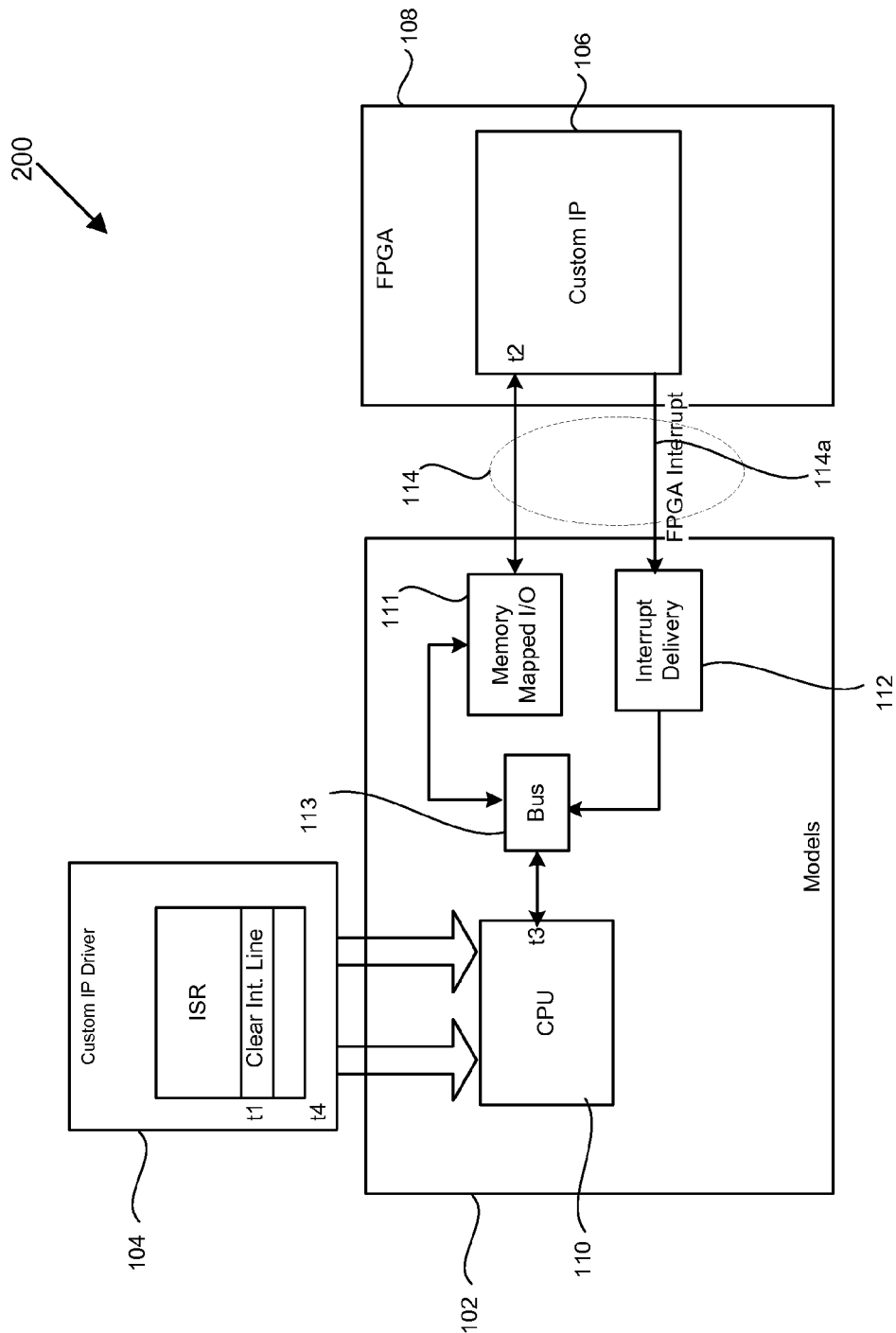
FIG. 2 is a diagrammatic representation of a co-simulation system in which illegal double interrupts may occur.

Any suitable co-simulation platform may be utilized during the software design process. FIG. 2 is a diagrammatic representation of a co-simulation system 200, in which illegal double interrupts may occur. In general, the system 200 may include software models module 102 for emulating standard components, which interface with one or more programmable devices, such as FPGA 108 via physical link 114.

The FPGA 108 may include custom IP (intellectual property) 106 that implements custom logic as described further herein. It would be difficult to develop software models for the FPGA since the FPGA is custom configured for each new design. Accordingly, software models may often only be developed for standard components that are not reconfigurable. Thus, a co-simulation system can be developed that utilizes software models 102 for standard components and the actual hardware, e.g., FPGA 108, for the customizable components.

The models module 102 may include any number and type of software models of standard components, such as a central processor unit (CPU) model 110 with embedded software. For example, the software models 102 may emulate a portion of a System-on-Chip (SoC) platform with a CPU 110 that is configurable to run software that is being developed with respect to such SoC platform. The software being developed may also include a custom IP driver 104 having an interrupt service routine (ISR) for custom IP 106 implemented in FPGA 108.

The models module 102 may also include a bus model 113 for emulating the routing between the different modules, e.g., CPU 110, and the physical link 114. The models modules may also include a memory mapped I/O bridge 111 for mapping memory transactions generated by the particular architecture, e.g., emulated CPU architecture, into a data format that is receivable by the physical link 114. For instance, the custom IP driver 104 may be operable to write to a particular memory register, and the memory mapped I/O bridge model 111 is or register location. In response to this register write, memory-mapped I/O may be configured to packetize to the bus format. However, to transfer through physical link, another packetization may be needed purely for simulation reasons. The packet may also be decoded by receiver into the original bus format created by Memory-mapped I/O.

The software models are operable to also handle interrupts from the hardware. For example, the software models 102 also may include an interrupt delivery module 112 to manage interrupt communication between FPGA 108 and the CPU module 110. The underlying hardware CPU, which is configured or programmed to emulate or model a particular CPU, may have a different pin configuration and data format than the modeled CPU. Accordingly, the interrupt delivery module 112 may be operable to receive an interrupt request in a particular format on a particular interrupt pin of the physical link and underlying physical CPU, decode the interrupt request, and send the decoded interrupt request to the model CPU 110 in the correct format and pin for such model CPU 110. For instance, the interrupt request may be received from custom IP 106 as a sequenced packet on a particular physical interrupt pin 114a of the physical link 114, e.g., a PCI-Express format. The interrupt delivery module 112 then unpacks the interrupt request, verifies the data, and then sends an interrupt request in a format that is expected by the CPU, e.g., a simple change in signal level received on a particular emulated pin of the emulated CPU. The bus logic 113 emulates the routing of the decoded physical line signal to the correct pin/line of the CPU 110.

The various functions, e.g., memory-mapped I/O, ISR, custom driver, CPU, etc. may be implemented by any suitable number and type of software modules. Additionally, the co-simulation system 100 may include any number and type of software and/or hardware modules, besides the illustrated components.

The software models 102, drivers, and custom IP 106 of the FPGA 108 are coupled with each other via physical link 114. The software models may be implemented on any suitable device, such as a general purpose computer. The computer is physically coupled with the custom IP 106 of the FPGA 108 through the physical link 114. Accordingly, the software models implemented on the computer hardware communicate with the custom IP 106 of FPGA, and visa versa, through physical link 114.

This physical link 114 may be any suitable number and type of physical interfaces for attaching hardware devices. By way of examples, the physical link may be designed for communication in any suitable format: PCI (peripheral component interface), PCI express, PCI-X, AGP (accelerated graphics port), VLB (VESA local), EISA (extended industry standard architecture), etc. In general, the physical link 114 may include any suitable number and type of connectors or conductive lines, such as pins, line traces, etc. The connectors of the physical link 114 may each be used to transmit and receive one or more signal types, such as data, addresses, interrupts, etc. For PCI-Express, two pairs of lines are used to transmit and receive a particular amount of data (e.g., byte) in the form of differential signals. Any connector may share multiple functions or signals (e.g., time or frequency multiplexed).

Some physical link protocols, such as PCI or PCI Express, may require the interrupt lines to be shared by multiple devices. Additionally, each interrupt may be transmitted from the custom IP 106 to the models module 102 using a dedicated line (e.g., interrupt line 114a) or a line shared with other types of signal, e.g., data.

The FPGA and one or more model modules (e.g., interrupt delivery and memory mapped I/O modules) may implement any suitable protocol for communicating on physical link 114. The CPU software 110 may be preconfigured with knowledge of the specific memory and I/O space for each physical device, such as custom IP 106, coupled with the physical link 114. The memory mapped I/O module 111 and interrupt delivery module 112 are operable to encode and decode communication (e.g., memory transactions and interrupt requests) between the CPU (and driver) and custom IP 106.

Although the physical link 114 may have a relatively high bandwidth (e.g., PCI), the link 114 may also have a high latency for handling communication between the software models 102 and the FPGA 108, as compared with communication latency on the final SoC. This higher latency may cause problems in simulation of the SoC as executed on system 200.

For example, a problem with an interrupt may occur in this co-simulation system 200. The custom IP 106 may assert an interrupt on an interrupt line 114a of physical link 114. The FPGA interrupt signal is received on line 114a into interrupt delivery module 112, which is operable to deliver an interrupt via bus module 113 to the custom IP driver 104, which may be configured with respect to CPU 110. During or after the interrupt is handled by the Interrupt Service Routine (ISR) in the Custom IP driver 104, the ISR may also be configured to send a request to clear the interrupt line 114a by writing to a memory-mapped register of memory mapped I/O module 111 at time t1, which causes the memory mapped I/O module to send a de-assertion request to the FPGA through physical link 114.

In the co-simulation setup 200, the request to clear interrupt line travels to Custom IP 106 in the FPGA 108 through bus module 113, memory-mapped I/O model 111, and physical link 114. Once the request to clear interrupt reaches the custom IP 106 at time t2, the custom IP 106 almost immediately de-asserts the interrupt line 115 on the physical link 114. However, the delay in the physical link 114 and the scheduling mechanism of the interrupt delivery model 112 may together or separately adversely affect the final delivery of the line de-assertion to the CPU model 110 at time t3. In response to the ISR request to clear the interrupt line 114a, the interrupt line going into the CPU 110 from the FPGA 108 needs to be de-asserted before the ISR exits at time t4. Because of non-deterministic latency, it may be difficult to guarantee that time t3 occurs before t4, resulting in double interrupt behavior in the driver 104.

Figure 3:
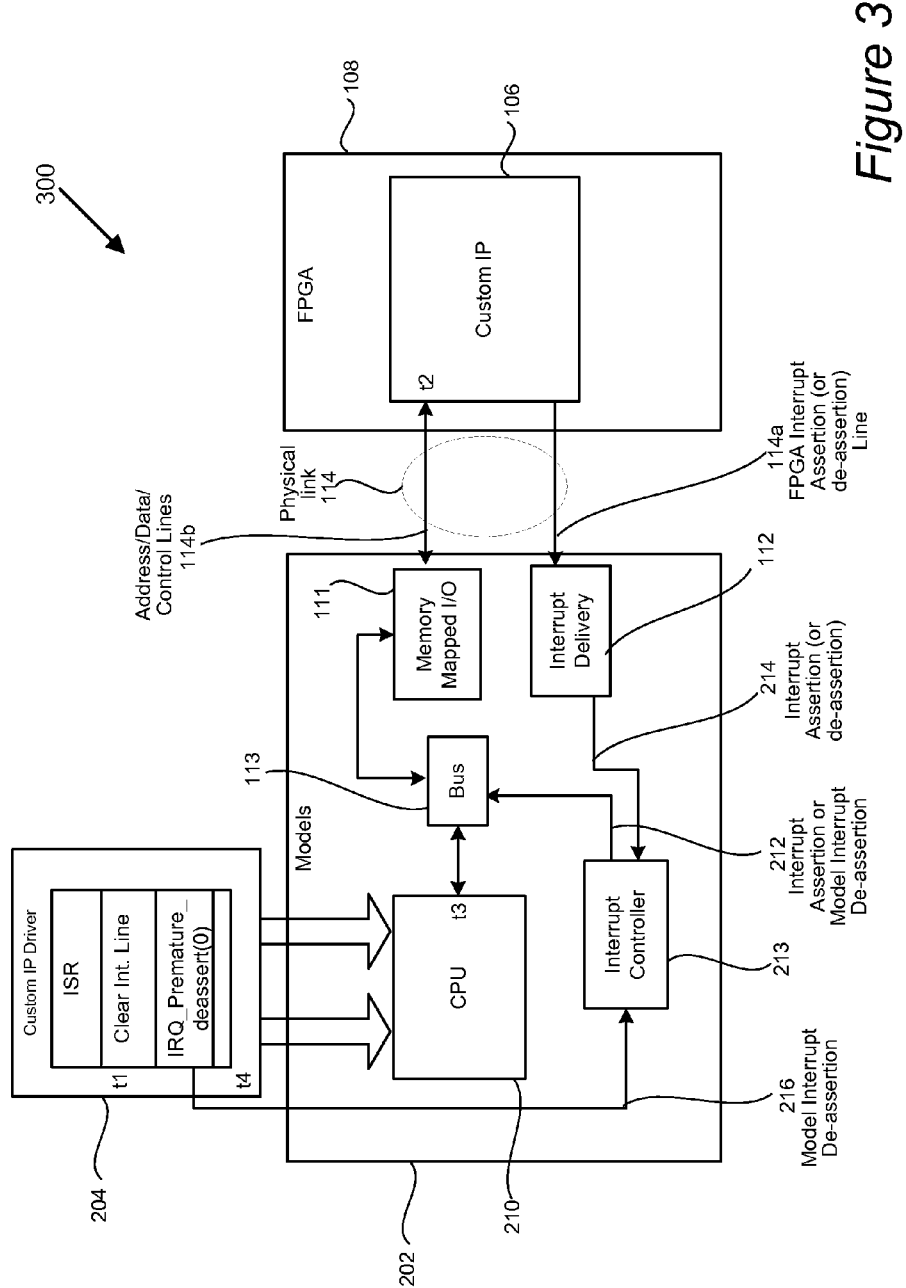
FIG. 3 is a diagrammatic representation of a co-simulation system that includes mechanisms for inhibiting illegal double interrupts in accordance with one embodiment of the present invention.
Figure 4:
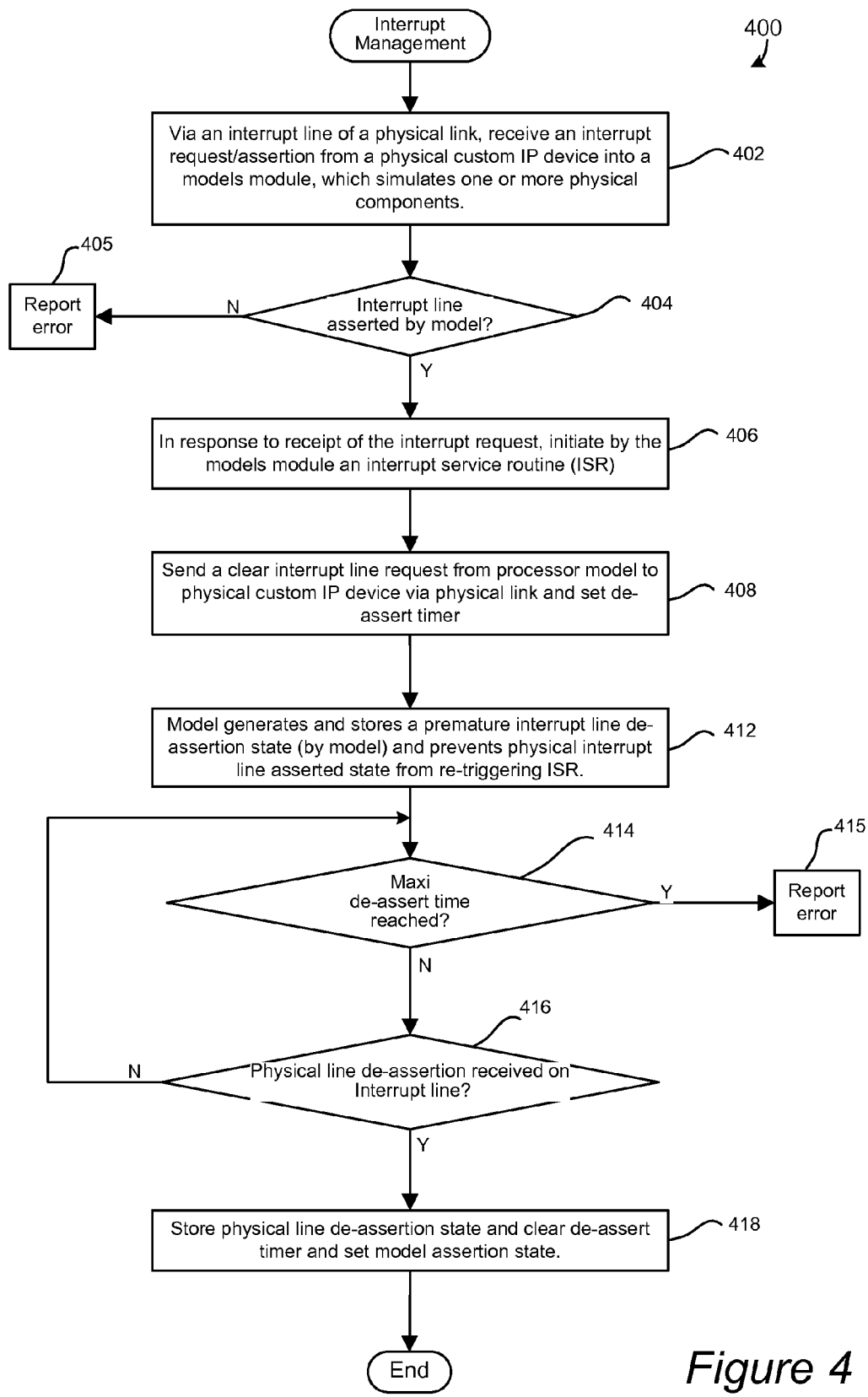
FIG. 4 is a flow chart illustrating an interrupt management procedure in accordance with an example embodiment of the present invention.

Certain embodiments of the present invention provide a framework for ensuring interrupt timing behavior that does not result in unexpected double interrupts due to a delay in receipt of a line de-assertion by a software module as sent from custom IP of an FPGA. This framework generally includes one or more additional mechanisms (e.g., software models and/or driver components) to substantially instantaneously change the interrupt line status from assertion to de-assertion without waiting for the physical interrupt to arrive so as to guarantee the correct software timing behavior. Such modification may be implemented in any suitable manner. FIG. 3 is a diagrammatic representation of a co-simulation system 300 that includes mechanisms for inhibiting illegal double interrupts in accordance with one embodiment of the present invention. FIG. 4 is a flow chart illustrating an interrupt management procedure 400 in accordance with an example embodiment of the present invention. This interrupt management procedure 400 will be described in conjunction with the co-simulation system 300 of FIG. 3. Some components of the system 300 of FIG. 3 may include some of the same mechanisms as described with respect to similar components of the system 200 of FIG. 2.

Initially, an interrupt request (assertion is received from a physical custom IP device (of programmable logic device or FPGA 108) may be received into a models module, which emulates one or more physical components, via an interrupt line of a physical link in operation 402. For instance, interrupt deliver module 112 receives an interrupt service request from custom IP 206 via physical link 114, decodes the interrupt request, and sends the decoded interrupt request to interrupt controller module 213.

By way of a specific example, the custom IP logic 106 of FPGA 108 may contain logic elements that have been configured to implement a UART (universal asynchronous receiver/transmitter) for a keyboard interface. The co-simulation platform 200 may also include simulation software to simulate data transmission from other physical devices that would be normally coupled to the custom IP, such as a keyboard. For example, the simulation data for a keyboard may send data that corresponds with pressing a particular key of a keyboard to the UART element of the custom IP 106. The UART of the custom IP 106 may be configured to send an interrupt request upon receipt of a keyboard key activation. The custom IP device 106 may also be configured to output the interrupt request or assertion from a particular pin of the FPGA 108, which is communicatively coupled with the models module 202 via interrupt line 114a of physical link 114.

The interrupt request may be received into a model component, such as interrupt delivery module 112, of models module 202 without any timing information. That is, the custom IP may be programmed such that there is no timing or clock information passed between the physical domain and the software domain.

The interrupt request may then be handled by interrupt controller module 213. The interrupt controller module 213 may track various interrupt line states, such as a fully asserted state, a fully de-asserted state, a virtually asserted, and a virtually de-asserted state. A fully asserted or de-asserted state corresponds to the interrupt line being asserted or de-asserted, respectively, on both the physical interrupt line (by the FPGA) and by the model. A virtually asserted or de-asserted state corresponds to the interrupt line being asserted or de-asserted, respectfully, by only the model and not on the physical interrupt line. These states may be tracked for each interrupt line and used for various error checking mechanisms. Other states may be tracked and maintained by embodiments of the present invention.

Alternatively, tracked states may include model assertion, model de-assertion, physical assertion, and physical de-assertion. With these four states, all combinations of virtual and physical line states may be tracked and managed. An invalid state combination may include a model assertion state not being present after initial receipt of physical assertion of an interrupt line (prior to a model de-assertion). Another invalid state combination includes an assertion by the model with a de-assertion on the physical interrupt line.

Referring back to the illustrated procedure, it may also be determined whether the interrupt line is asserted by the model (e.g., both model and physical assertion states are present) in operation 404. For example, interrupt controller 213 may check whether an assertion state by the model (for the current asserted interrupt) has been set. This check may be used to only initiate handling of a physical interrupt assertion (e.g., initiation of an interrupt service routine) when a model de-assertion has not commenced. For instance, the interrupt controller model 213 may only send the decoded interrupt assertion to the CPU model only if the model assertion has been set and a previous premature model de-assertion and subsequent physical de-assertion have both been completed. A model assertion state may have been set by the model after a physical de-assertion was received on the interrupt line 114a or set during a system initialization step. If an assertion by the model is not set, an error may be reported in operation 405. A corresponding error handling routine may also or alternatively be performed.

Another invalid state combination may include assertion by only the model, while the physical interrupt line is de-asserted. Although not shown, it may periodically be determined whether this invalid state combination has occurred. If such invalid state combination has occurred, an error may be reported, as well as a corresponding error handling routine may be performed.

Referring back to the illustrated embodiment, an interrupt service routine (ISR) may be initiated by the models module in operation 406 in response to receipt of the interrupt service request and if there is not currently a model de-assertion. For instance, the interrupt for pressing a particular keyboard key is handled by a particular ISR (in custom IP driver 204) for handling a key pressing type interrupt.

Prior to completion of the particular ISR, a clear interrupt line request may also be sent from the processor model to the physical custom IP device via a physical link and a de-assert timer may be reset in operation 408. For instance, the custom IP driver 204 writes to a particular memory register that corresponds to the particular custom IP device and sets a predefined counter or timer for determining whether too much time elapses between a clear line request and a corresponding de-assertion of such line.

A memory register access task, such as a memory access for requesting a clear interrupt line by the custom IP device 106, may form part of the ISR of the driver. The memory access that is generated by driver 204 of processor model 210 may also be routed by bus model 113 to physical link 114 via memory mapped I/O model 111. The memory mapped I/O model 111 then is operable to map the memory access to an appropriately formatted memory access command being output on the appropriate lines of physical link 114 as described above. The custom IP 106 will receive the clear interrupt line request on physical link 114, for example, on specific ones of the address/data/control lines 114b that are configured for receiving requests from a CPU bus. Upon receipt of this clear line request, the custom IP 106 is operable to then immediately clear or de-assert the interrupt line (e.g., 114a) as requested by the custom IP driver 204.

However, since there may be a delay between the time t1 at which the clear interrupt line request is sent by the ISR and time t2 at which the custom IP device 106 actually receives such request and clears the interrupt line 114a, the models module 202 is also operable to internally generate a "mock" or premature line de-assertion for the physical interrupt line 114a of the physical link 114. That is, the models module 202 is operable to generate a premature interrupt line de-assertion as if such de-assertion is being received by the models module 202 from the interrupt line 114a of the physical link 114. As shown in FIG. 4, the model generates and stores a premature interrupt line de-assertion state (by model), as well as prevents the physical interrupt line's asserted state from re-triggering the ISR in operation 412.

Generation of a premature interrupt line de-assertion may be accomplished by the models module 202, in conjunction with software that is being developed on such models module, in any suitable way. For instance, the last line of the ISR of custom IP driver 204 of processor module 210, initiates a premature line de-assertion after the ISR, including the clear interrupt line request, is performed, for example. In a specific example, the custom IP driver 204 specifies a request for a premature line de-assertion and this request is received by interrupt controller 213. In response to receipt of this premature de-assertion request, the interrupt controller 213 generates an interrupt line de-assertion signal or command in a form that is receivable by the CPU model 210 through bus model 113 at time t3. For instance, the CPU model 210 sees a level change (e.g., high to low) for an interrupt pin that is virtually coupled with the custom IP device 106 via various model models.

In effect, the actual asserted physical state of the physical interrupt line is not received by the CPU model 210. For example, the interrupt controller model 213 also prevents the state of the asserted physical interrupt line assertion from reaching the CPU model 210 and custom IP driver 204 to thereby prevent re-triggering of the ISR. Instead, the virtual premature de-assert of the interrupt line is received by the CPU model 210. Since a virtual de-assertion by the model is indistinguishable from a physical de-assertion from the FPGA and the CPU model 210 is kept unaware of the asserted state of the physical interrupt line, the CPU model 210 simply sees de-assertion of the interrupt line and the ISR for the corresponding interrupt line is prevented from being triggered again even though the physical line has yet to be de-asserted.

After the model (e.g., interrupt controller model 213) has generated the premature or virtual de-assertion for the interrupt line, it may then be determined whether a maximum de-assertion time has been reached in operation 414. In one implementation, a counter or timer may be used to determine whether a predefined maximum time has lapsed since the last clear line request was sent for the particular interrupt being managed. If a predefined maximum time has been reached, an error report may be generated in operation 415. A corresponding error handling routine may also or alternatively be performed.

If too much time has not elapsed, it may also be determined whether a physical line de-assertion has been received on the interrupt line operation 416. If a physical de-assert has not been received, the procedure may continue to wait and check to determine if too much time has elapsed. When a physical line de-assertion is received and too much time has not elapsed, the physical line de-assertion state may be stored and the de-assert timer cleared in operation 418. A model assertion state may also be set so that the next interrupt request may be received and handled correctly.

Certain embodiments of the present invention allow correct timing for interrupts in a co-simulation environment, as compared to other possible approaches. In a TLM (transaction level modeling) approach to ensure correct timing between the physical and software domains, a simulated delay that matches the physical de-assertion delay may be implemented by the model. However, the problem with this approach is that the simulation of certain modules, such as a CPU operating system, is ideally run at high processing speeds. Thus, introduction of an extra delay would not be desirable in this type of simulation. Many simulation domains are either completely timing-decoupled or have very coarse grained timing synchronization between each other. In this case, this solution still fails to guarantee the correct interrupt line behaviors. In another approach, the interrupt may be converted from a level type to an edge triggered type. However, this approach tends to be inaccurate due to noise and different detection hardware emulators would need to be utilized in the simulation environment, as compared to the actual level-detection hardware of the corresponding system designs.

Embodiments of the present invention may be utilized in relation to any co-simulation environment that includes both software modules and physical devices that send interrupts to the software modules. One example of a physical device is a programmable logic device (PLD). PLD's are integrated circuits that can be configured by a user to perform custom logic functions. Although embodiments of the present invention may be used in the context of any integrated circuit that has circuitry that can be configured by a user to perform a custom function, certain embodiments of the present invention are described in the context of programmable logic devices for clarity.

The disclosed techniques of the present invention may be implemented in any suitable combination of software and/or hardware system, such as a web-based server or desktop computer system. Moreover, a system implementing various embodiments of the invention may be a portable device, such as a laptop. The apparatus of embodiments of this invention, such as for implementing the models, may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 5:
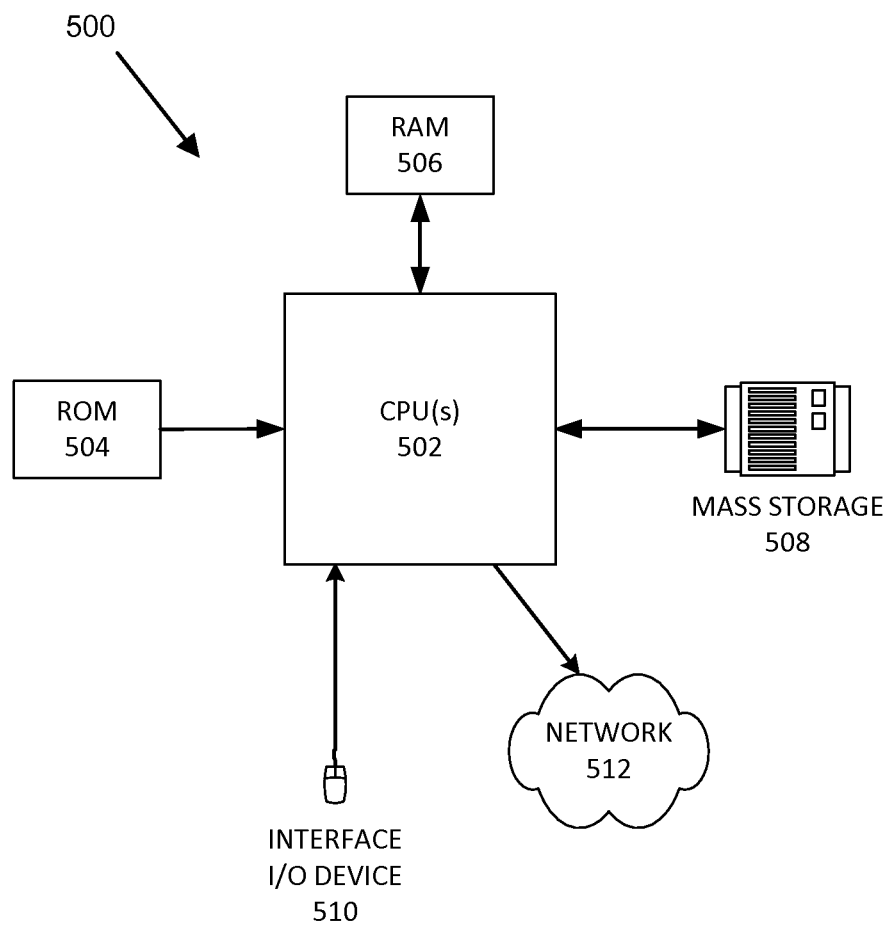
FIG. 5 illustrates a typical computer system that can be used in connection with one or more embodiments of the present invention.

FIG. 5 illustrates a typical computer system 500 that can be used in connection with one or more embodiments of the present invention. The computer system 500 includes one or more processors 502 (also referred to as central processing units, or CPUs) that are coupled to storage devices including primary storage 506 (typically a random access memory, or RAM) and another primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media described above, including a computer program product comprising a machine readable medium on which is provided program instructions according to one or more embodiments of the present invention. A mass storage device 508 also is coupled bi-directionally to CPU 502 and provides additional data storage capacity and may include any of the computer-readable media described above, including a computer program product comprising a machine readable medium on which is provided program instructions according to one or more embodiments of the present invention. The mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM may also pass data uni-directionally to the CPU.

CPU 502 also may be coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

The hardware elements described above may define multiple software modules for performing one or more operations according to embodiments of the present invention. For example, instructions for running various model modules, executing a simulation, and interfacing with a physical device, such as an FPGA, may be stored on mass storage device 508 or 504 and executed on CPU 502 in conjunction with primary memory 506.

According to various embodiments, input may be obtained using a wide variety of techniques. For example, input for downloading or launching an application may be obtained via a graphical user interface from a user's interaction with a local application such as a web site or web-based application or service and may be accomplished using any of a variety of well-known mechanisms for obtaining information from a user. However, it should be understood that such methods of obtaining input from a user are merely examples and that input may be obtained in many other ways.

Because such information and program instructions may be employed to implement the systems/methods described herein, embodiments of the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Figure 6:
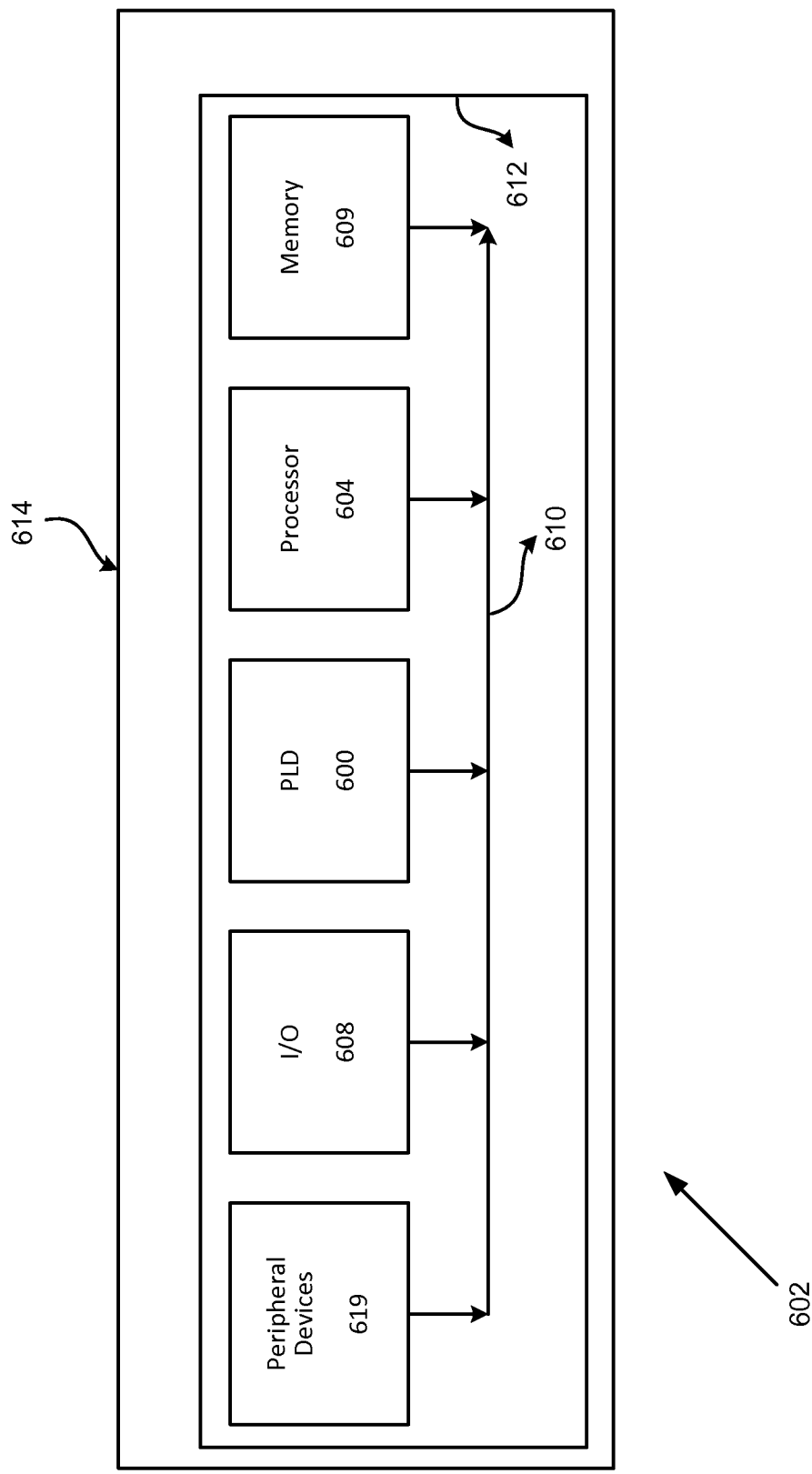
FIG. 6 is a block diagram depicting a hardware system, which may utilize software that is debugged in co-simulation embodiments of the present invention.

FIG. 6 illustrates a PLD 600 in a data processing system 602. This example hardware system 602 may utilize software that is debugged in co-simulation embodiments of the present invention. The data processing system 602 may include one or more of the following components: a processor 604; memory 609; I/O circuitry 608; and peripheral devices 619. These components are coupled together by a system bus 610 and are populated on a circuit board 612 which is contained in an end-user system 614.

The system 602 can be used in a wide variety of applications, such as computer networking, data networking, instrumentation, video processing, digital signal processing, or any other application where the advantage of using reprogrammable logic is desirable. The PLD 600 can be used to perform a variety of different logic functions.

Figure 7:
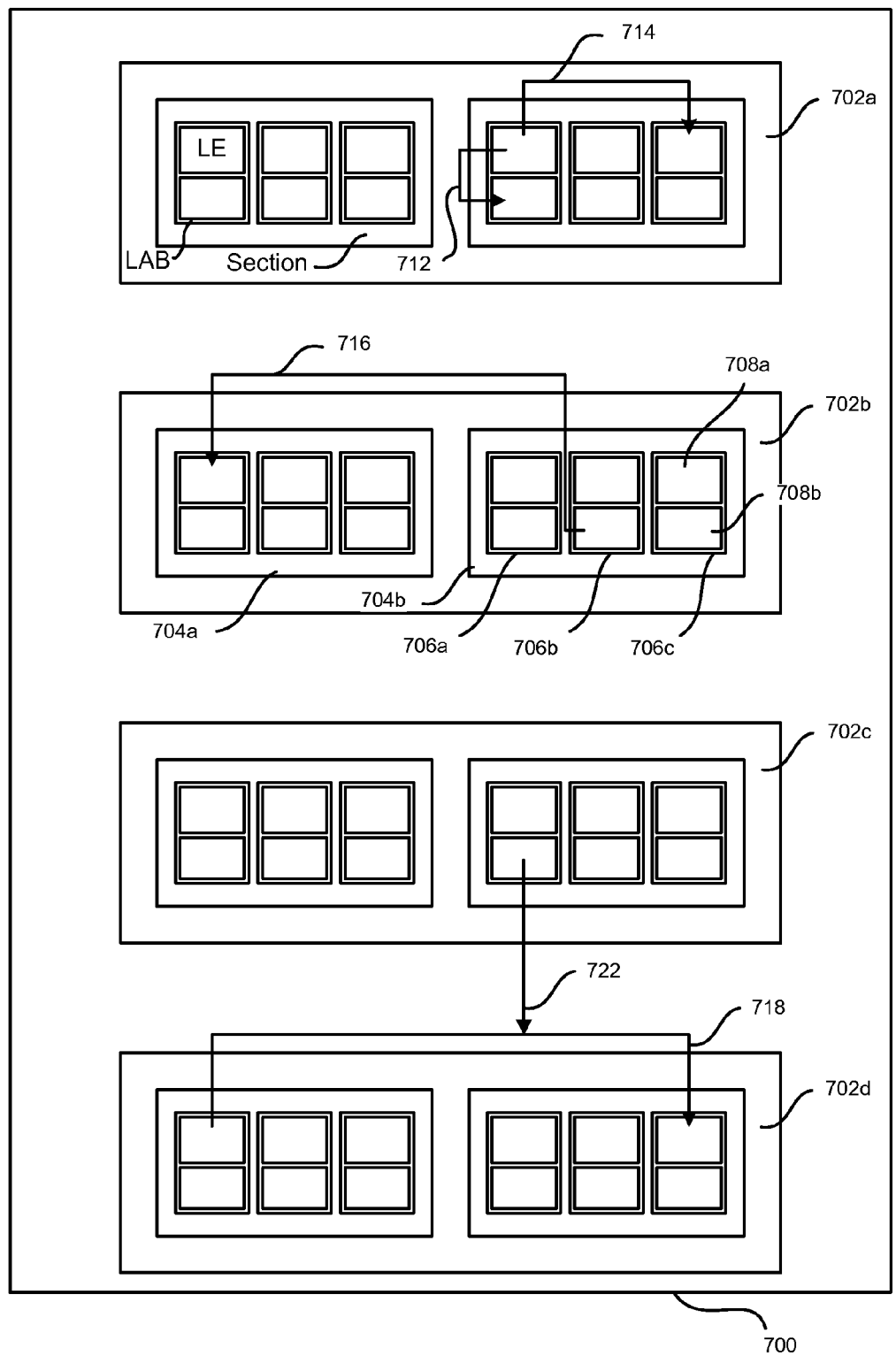
FIG. 7 is an idealized block representation of the architecture of an arbitrary hardware device, which may be utilized in co-simulation embodiments of the present invention.

In synthesizing configurable components for a hardware design from a simulation version, a user may use a compiler to generate the design for implementation on hardware. One or more configurable devices may be utilized in co-simulation embodiments of the present invention The form of a configurable design may be further understood with reference to a hypothetical target hardware device having multiple hierarchical levels. Such a hardware device is represented in FIG. 7. This idealized representation roughly conforms to the layout of a FLEX 10K programmable logic device available from Altera Corporation of San Jose, Calif. In FIG. 7, a programmable logic device 700 is segmented into a plurality of "rows" to facilitate interconnection between logic elements on a given row. In the hypothetical example shown, there are four rows: 702a, 702b, 702c, and 702d.

Each row of programmable logic device 700 is further subdivided into two "half-rows." For example, row 702b is shown to contain a half-row 704a and a half-row 704b. The next lower level of the hierarchy is the "logic array block" (LAB). Half-row 704b, for example, contains three LABs: an LAB 706a, an LAB 706b, and an LAB 706c. Finally, at the base of the hierarchy are several logic elements. Each such logic element may exist within a single logic array block. For example, LAB 706c includes two logic elements: a logic element 708a and a logic element 708b.

In short, PLD 700 includes four hierarchical levels: (1) rows, (2) half-rows, (3) LABs, and (4) logic elements (LEs). Any logic element within PLD 700 can be uniquely specified (and located) by specifying a value for each of these four levels of the containment hierarchy. For example, logic element 708b can be specified as follows: row (2), half-row (2), LAB (3), LE (2). To fit a logic design onto a target hardware device such as that shown in FIG. 7, a synthesized netlist may be divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 700 includes multiple levels of routing lines (interconnects). These connect the uniquely placed logic cells to complete circuits. In PLD 700, for example, four levels of interconnect are provided, one for each of the four hierarchy levels. First a local interconnect such as interconnect 712 is employed to connect two logic elements within the same LAB. At the next level, a LAB-to-LAB interconnect such as interconnect 714 is employed to connect two LABs within the same half-row. At the next higher level, a "global horizontal" interconnect is employed to connect logic elements lying in the same row but in different half-rows. An example of a global horizontal interconnect is interconnect 716 shown in row 702*b*. Another global horizontal interconnect is shown as interconnect 718, linking logic elements within row 702*d*. Finally, a "global vertical" interconnect is employed to link a logic element in one row with a logic element in a different row. For example, a global vertical interconnect 722 connects a logic element in the first LAB of the second half-row of row 702*c* to two separate logic elements in row 702*d*. In the embodiment shown, this is accomplished by providing global vertical interconnect 722 between the above-described logic element in row 702*c* to global horizontal interconnect 718 in row 702*d*. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit. Briefly, in one FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 9-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ICs that can benefit from application of the present invention.

This invention also relates to programmable logic and other devices programmed with a software design prepared in accordance with the above described methods and/or using a computer program product according to one or more embodiments of the present invention. Certain embodiments may further relate to systems employing such programmable logic devices.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of simulating a software design that is to be implemented in a system, comprising:
    (a) providing a co-simulation platform comprising a physical link coupling a first physical component with a models module, which emulates one or more other physical components of the system, wherein such models module includes a processor model associated with an interrupt service routine (ISR) for handling an interrupt on an interrupt line of the first physical component;
    (b) via the physical link, receiving into the models module an interrupt request from the interrupt line of the first physical component;
    (c) in response to the received interrupt request, initiating the ISR associated with the processor model;
    (d) prior to exiting the ISR, sending a interrupt line de-assert request from the models module to the first physical component via the physical link; and
    (e) prior to exiting the ISR and prior to receiving a physical de-assertion of the interrupt line from the first physical component via the physical link, generating by the models module a premature de-assertion of the interrupt line and causing such premature de-assertion to be received by the processor model.

2. The method of claim 1, wherein receipt of the interrupt request and initiation of the ISR form part of a simulation for debugging the software design that is to be implemented in the system.

3. The method of claim 2, wherein operations (a)-(e) are performed after verifying functional operation of a hardware design of the system and prior to fabrication of the system based on such hardware design.

4. The method of claim 3, further comprising:
    integrating the software design into the fabricated system after the software design is debugged via the simulation of such software design on the co-simulation platform.

5. The method of claim 1, further comprising:
    after causing the premature de-assertion to be received by the processor model, preventing the interrupt request from being received by the processor model so that the associated ISR is not retriggered after the ISR exits and prior to de-assertion of the interrupt line by the first physical component.

6. The method of claim 1, wherein the interrupt request is received into the models module without timing information.

7. The method of claim 1, wherein generating by the models module a premature de-assertion of the interrupt line and causing such premature de-assertion to be received by the processor model is accomplished by:
    after the ISR is initiated, sending by the ISR a request for the premature de-assertion of the interrupt line to an interrupt controller module in the models module; and
    upon receipt of the request for the premature de-assertion by the interrupt controller, the interrupt controller generating a premature de-assertion of the interrupt line that is sent to the processor model and preventing the interrupt request from reaching the processor.

8. The method as recited in claim 7, further comprising tracking a plurality of states for de-assertion and assertion by the models module and by the first physical device.

9. The method of claim 1, further comprising:
    setting a de-assertion timer for determining a time duration since sending the interrupt line de-assert request; and
    if it is determined that the time duration since sending the interrupt line de-assert request has reached a predefined maximum based on the de-assertion timer, reporting an error for the time duration.

10. The method of claim 1, wherein the first physical component is a custom IP device of a programmable logic device.

11. The apparatus of claim 10, wherein receipt of the interrupt request and initiation of the ISR form part of a simulation for debugging the software design that is to be implemented in the system.

12. The apparatus of claim 10, wherein the models module is further configured for:

after causing the premature de-assertion to be received by the processor model, preventing the interrupt request from being received by the processor model so that the associated ISR is not retriggered after the ISR exits and prior to de-assertion of the interrupt line by the first physical component.

13. The apparatus of claim 10, wherein generating by the models module a premature de-assertion of the interrupt line and causing such premature de-assertion to be received by the processor model is accomplished by:

after the ISR is initiated, sending by the ISR a request for the premature de-assertion of the interrupt line to an interrupt controller module in the models module; and upon receipt of the request for the premature de-assertion by the interrupt controller, the interrupt controller generating a premature de-assertion of the interrupt line that is sent to the processor model and preventing the interrupt request from reaching the processor.

14. The apparatus of claim 10, wherein the first physical component is a custom IP device of a programmable logic device.

15. A co-simulation platform for simulating a software design that is to be implemented in a system, comprising:

a first physical component configured to represent a configurable component of the system;

a models module configured to emulate one or more other physical components of the system, wherein such models module includes a processor model associated with an interrupt service routine (ISR) for handling an interrupt on an interrupt line of the first physical component; and a physical link for coupling the first physical component with the models module, and wherein the models module is further configured to perform the following operations:

via the physical link, receiving into the models module an interrupt request from the interrupt line of the first physical component;

in response to the received interrupt request, initiating the ISR associated with the processor model;

prior to exiting the ISR, sending a interrupt line de-assert request from the models module to the first physical component via the physical link; and prior to exiting the ISR and prior to receiving a physical de-assertion of the interrupt line from the first physical component via the physical link, generating by the models module a premature de-assertion of the interrupt line and causing such premature de-assertion to be received by the processor model.

16. At least one computer readable storage medium having computer program instructions stored thereon that are arranged to perform the following operations:

(a) providing a co-simulation platform comprising a physical link coupling a first physical component with a models module, which emulates one or more other physical components of the system, wherein such models module includes a processor model associated with an interrupt service routine (ISR) for handling an interrupt on an interrupt line of the first physical component;

(b) via the physical link, receiving into the models module an interrupt request from the interrupt line of the first physical component;

(c) in response to the received interrupt request, initiating the ISR associated with the processor model;

(d) prior to exiting the ISR, sending a interrupt line de-assert request from the models module to the first physical component via the physical link; and (e) prior to exiting the ISR and prior to receiving a physical de-assertion of the interrupt line from the first physical component via the physical link, generating by the models module a premature de-assertion of the interrupt line and causing such premature de-assertion to be received by the processor model.

17. The at least one computer readable storage medium of claim 16, wherein receipt of the interrupt request and initiation of the ISR form part of a simulation for debugging the software design that is to be implemented in the system.

18. The at least one computer readable storage medium of claim 16, wherein the computer program instructions are further arranged for:

after causing the premature de-assertion to be received by the processor model, preventing the interrupt request from being received by the processor model so that the associated ISR is not retriggered after the ISR exits and prior to de-assertion of the interrupt line by the first physical component.

19. The at least one computer readable storage medium of claim 16, wherein generating by the models module a premature de-assertion of the interrupt line and causing such premature de-assertion to be received by the processor model is accomplished by:

after the ISR is initiated, sending by the ISR a request for the premature de-assertion of the interrupt line to an interrupt controller module in the models module; and upon receipt of the request for the premature de-assertion by the interrupt controller, the interrupt controller generating a premature de-assertion of the interrupt line that is sent to the processor model and preventing the interrupt request from reaching the processor.

20. The at least one computer readable storage medium of claim 16, wherein the computer program instructions are further arranged for tracking a plurality of states for de-assertion and assertion by the models module and by the first physical device.

* * * * *